Feb. 21, 1967

J. C. TUCCI 3,304,914

DISPENSING CONTAINER

Filed March 26, 1965

INVENTOR.
JULIUS C. TUCCI,
BY

Berman, Davidson & Berman
ATTORNEY.

Feb. 21, 1967 J. C. TUCCI 3,304,914
DISPENSING CONTAINER
Filed March 26, 1965 2 Sheets-Sheet 2
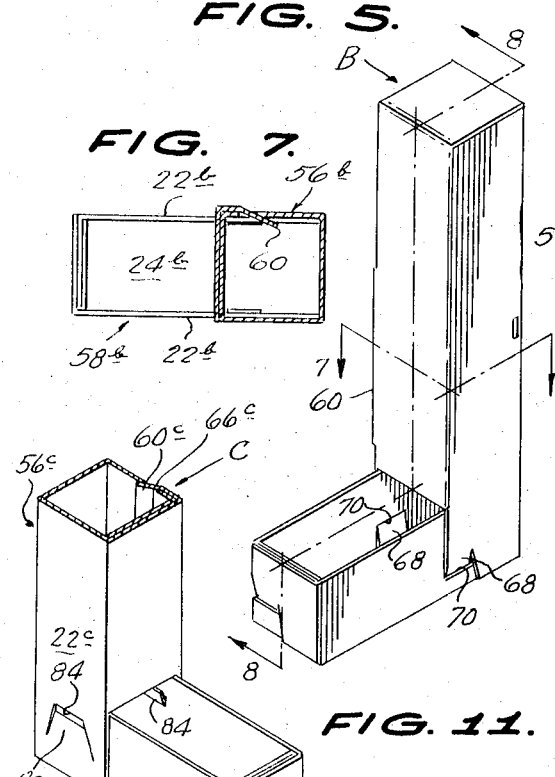
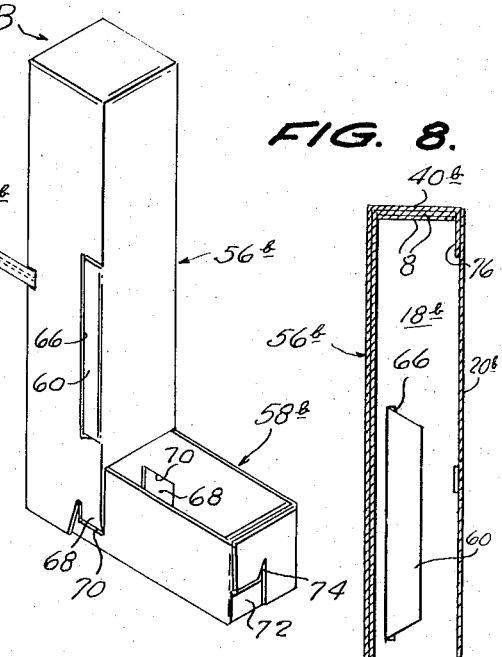
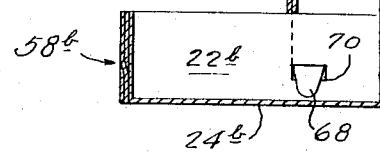
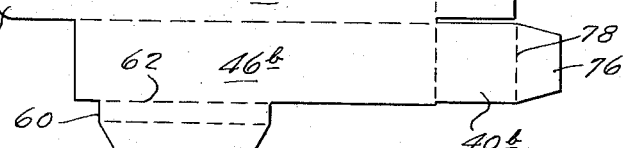
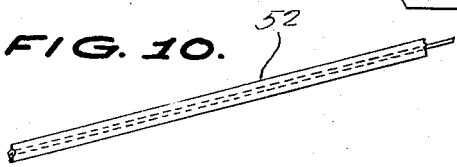
INVENTOR.
JULIUS C. TUCCI,
BY
Berman, Davidson & Berman
ATTORNEYS.

United States Patent Office 3,304,914
Patented Feb. 21, 1967

3,304,914
DISPENSING CONTAINER
Julius C. Tucci, 181 W. 2nd St., Weston, W. Va. 26452
Filed Mar. 26, 1965, Ser. No. 442,935
7 Claims. (Cl. 119—18)

This invention relates to dispensing containers, and more particularly to containers of this kind, of either disposable or permanent character, constructed to contain and automatically dispense comminuted material or articles of small sizes into built-in troughs.

The primary object of the invention is the provision of simple, economical and easily made devices of the kind indicated above, adapted to serve as shipping and storage containers, and adapted to be easily opened for dispensing material, at the places of use, the containers having simple means for securing the same to supports, such as the sides of bird cages, where the containers are filled with bird food, gravel, and the like.

Another object of the invention is the provision of devices of the character indicated above, which are adapted to be formed of single blanks of sheet material.

In the drawings:

FIGURE 5 is a side perspective view of a knock-down form of device of the present invention adapted to be set up at the place of use;

FIGURE 6 is a perspective view of the opposite side of FIGURE 5;

FIGURE 7 is a horizontal section taken on the line 7—7 of FIGURE 5;

FIGURE 8 is a vertical section taken on the line 8—8 of FIGURE 5;

FIGURE 9 is a plan view of the single blank from which the device of FIGURES 5 to 8 is formed;

FIGURE 10 is an enlarged fragmentary planned view of a covered bendable metal strip used as the mounting means;

FIGURE 11 is a perspective view of another knock-down form of device of the invention.

Figure 1:
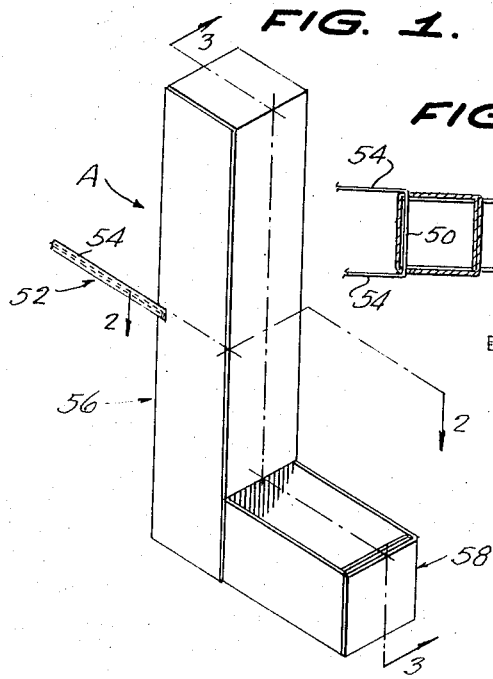
FIGURE 1 is a perspective view of a device of the present invention, showing the same opened for dispensing.

Referring in detail to the drawings, and first to FIGURES 1 to 4 thereof, the device therein shown and designated A is formed from a single blank 10 (FIGURE 4), of elongated, generally rectangular shape. The blank 10 comprises an elongated feeder-forming portion 12, on one end of which is a trough-forming portion 14, which, as here shown, is somewhat shorter than the portion 12. The portions 12 and 14 have in common, horizontal fold lines 16, which are parallel spaced from each other and from the side edges of the portions 12 and 14.

The fold lines 16 define, as to the portion 12, sidewalls 18 and a back wall 20, and, as to the portion 14, sidewalls 22 and a bottom wall 24. The sidewalls 22 of the trough-forming portion 14, are separated from the sidewalls 18 of the feeder-forming portion 12, by transverse slots 26.

The portion 14 is formed, adjacent to its end remote from the portion 12, with a single transverse fold line 28 extending entirely thereacross, and at its other end, with a single transverse fold line 30, which extends only across the back wall 20. The fold line 28 defines trough end wall forming flaps on the portion 14 which are separated from each other by longitudinal slots 32 which extend to the fold line 30. The flaps include a center or middle flap 33, and side flaps 34.

A single transverse fold line 36 extends entirely across the end of the feeder-forming portion 12, at the end thereof remote from the portion 14, and to the fold line 36, in line with the longitudinal fold lines 16, extend slots 38, which define feeder portion closure flaps, for the upper end thereof. These flaps comprise outer flaps 40, and two inner flaps 42.

On the side edges of the feeder-forming portion 12 are longitudinal fold lines 44, which connect thereto, longitudinally-elongated side flaps, shorter than the portion 12, and spaced from the portion 14, which serve as front walls 46.

Figure 2:
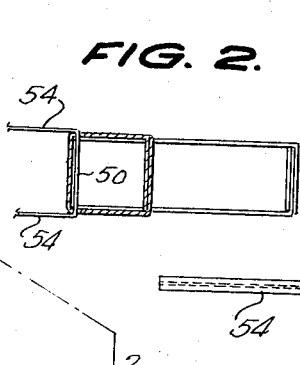
FIGURE 2 is a horizontal section taken on the line 2—2 of FIGURE 1.
Figure 3:
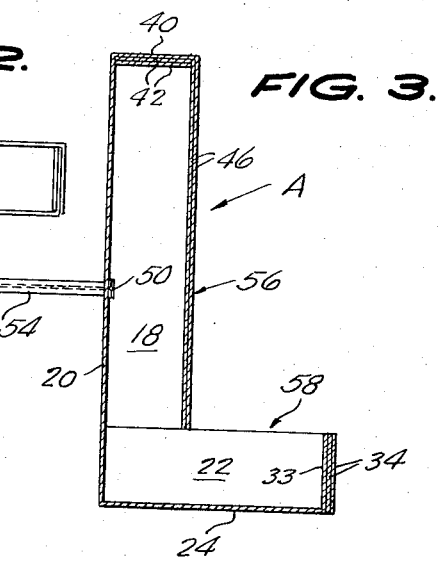
FIGURE 3 is a vertical section taken on the line 3—3 of FIGURE 1.
Figure 4:
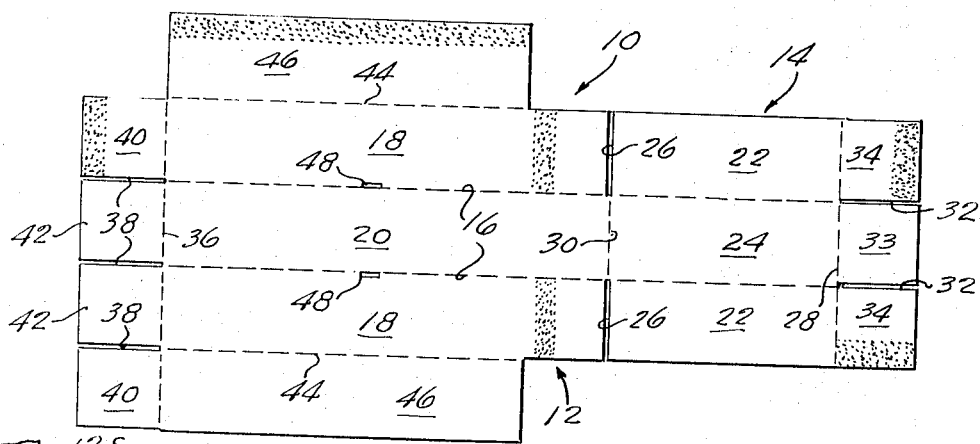
FIGURE 4 is a plan view of the single blank from which the said device is formed.

Adjacent to the fold lines 16, of the portion 12, and intermediate the ends thereof, short longitudinal slots 48 are provided to pass in front of the back wall 20 of the portion 12, the intermediate part 50 of a covered bendable mounting strip 52, shown in FIGURE 10, whose ends 54 are adapted to be extended rearwardly, as indicated in FIGURES 1, 2 and 3, for securement to a support, such as the side of a bird cage (not shown).

The blank 10 is assembled to form the device A by bending the blank to position the feeder-portion sidewalls in parallel spaced relationship, normal to the back wall 20 and then overlapping and suitably securing the front walls 46 together, as by means of cement or glue, so as to form a tubular feeder 56.

The trough portion 14 is then formed into a trough 58, disposed at right angles to the feeder 56, and extending forwardly therefrom, by bending up the sidewalls 22, and then overlapping and securing together, in any suitable manner, the end wall forming flaps 33, 34. The open top of the trough 58 is adapted to be covered by any suitable removable sheet material (not shown) for containing the contents of the trough during transport and storage.

After the feeder 56 and the trough 58 have been filled, through the open upper end of the feeder 56 with the material to be dispensed, the top of the feeder is closed by overlapping and securing together, in any suitable manner, the flaps 40, 42.

In operation, as material is removed from the trough 58, the trough is automatically and gravitationally kept filled with material from the feeder 56.

The knock-down form of the device B, shown in FIGURES 5 through 9, is formed from a single blank 10b, which is designed to be assembled without the use of glue, cement or other applied fastening means, but instead, by means of self-contained fastening or securing means.

The blank 10b is generally similar to the blank 10 of FIGURES 1 to 4, and has a feeder-forming portion 12b and a trough-forming portion 14b. The feeder portion 12b is assembled to form the feeder 56b, by means of a short longitudinally-elongated tongue 60, on the outer edge of front wall 46b, adjacent to its inner end, which is adapted to be folded on a longitudinal fold line 62, and again on a longitudinal fold line 64 formed in the tongue 60, with the tapered outer end 64' of the tongue inserted rearwardly through an accommodating slot 66, formed in the related sidewall 18, near the outer edge of the latter.

The inner edges of the transverse slots 26b are modified to provide short rounded tabs 68, at the outer ends thereof, which are adapted to be inserted downwardly through accommodating slots 70 provided in the trough sidewalls 22b near the slots 26b, whereby the trough 58b is positively held up in normal relation to the feeder 56b.

One of the end flaps 34b of the trough 58b is formed with a lateral rounded tab 72, which is adapted to be inserted horizontally through an accommodating slot 74, provided in the other flap 34b.

The top of the feeder 56b is closed by a single end flap 40b, having a tapered extension 76 on its outer end, which is adapted to be bent downwardly on a fold line 78, to bear, as shown in FIGURE 8, against the inner surface of the back wall 20b, and by only two other laterally-spaced flaps 80 adapted to be overlapped beneath the single end flap 40b.

Figure 12:
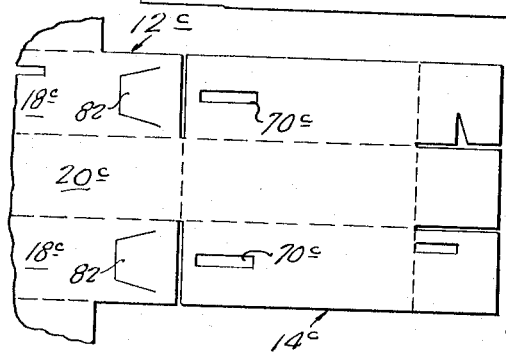
FIGURE 12 is a fragmentary view of the single blank from which the device of FIGURE 11 is formed.

The knock-down form C of FIGURES 11 and 12 has a trough 58c made up like the trough 58b of FIGURES 5 to 9, and a feeder 56c, made up like the feeder 56b. However, the sidewalls 18c of the feeder 56c are additionally formed with tapered inwardly-extending tongues 82, adjacent to their lower ends, which are adapted to be bent inwardly and inserted upwardly through slots 84, provided in the sidewalls 22c of the trough 58c for holding the trough 58c up in place.

What is claimed is:

1. A device of the character described, comprising a vertically elongated tube of rectangular cross section, said tube having a back wall, side walls extending forwardly from the back wall, front wall means extending between the side walls, a bottom wall on the back wall extending forwardly beyond the tube, an open top trough composed of said bottom wall and upstanding side walls extending along the inner sides of the tube side walls, said trough having an upstanding front wall extending between the trough side walls, tab means on the tube side walls, said trough side walls being formed with slit means through which the tab means extend.

2. The device of claim 1, wherein said tab means comprises upwardly extending tabs.

3. The device of claim 1, wherein said tab means comprises downwardly extending tabs.

4. The device of claim 1, wherein the front wall of the trough is composed of overlapped flaps, including a front flap and another flap behind the front flap, said other flap having a reduced width tab, said front flap having a vertical slot through which said tab is engaged.

5. A device of the character described, comprising a vertically elongated tube of rectangular cross section, said tube having a back wall, side walls extending forwardly from the back wall, front wall means extending between the side walls, a bottom wall on the back wall extending forwardly beyond the tube, an open top trough composed of said bottom wall and upstanding side walls extending along the inner sides of the tube side walls, said trough having an upstanding front wall extending between the trough side walls, tab means on the tube side walls, said trough side walls being formed with slit means through which the tab means extend, the device being formed from a single blank, said blank being of elongated rectangular form having side edges and end edges, a pair of longitudinal parallel fold lines extending the length of the blank, said fold lines being equally spaced from each other and from the side edges of the blank and defining middle and outer panels, said side edges having longitudinal side flaps thereon spaced from the end edges of the blank, said flaps being substantially the same in width as said panels, said outer panels being formed adjacent to said flaps with tabs, the blank being formed with slots adapted to receive said tabs, one end edge of the blank being formed with longitudinal slots aligned with the fold lines, an outer transverse fold line adjacent to and spaced from said one end edge, said transverse fold line and said longitudinal slots defining side flaps and outer flaps, one of said outer flaps being formed with a lateral tab extending inwardly, the other outer flap being formed with a longitudinal slot adapted to receive said other outer flap.

6. A device of the character described, comprising a vertically elongated tube of rectangular cross section, said tube having a back wall, side walls extending forwardly from the back wall, front wall means extending between the side walls, a bottom wall on the back wall extending forwardly beyond the tube, an open top trough composed of said bottom wall and upstanding side walls extending along the inner sides of the tube side walls, said trough having an upstanding front wall extending between the trough side walls, tab means on the tube side walls, said trough side walls being formed with slit means through which the tab means extend, the device being formed from a single blank, said blank being of elongated rectangular form having side edges and end edges, a pair of longitudinal parallel fold lines extending the length of the blank, said fold lines being equally spaced from each other and from the side edges of the blank and defining middle and outer panels, said side edges having longitudinal side flaps thereon spaced from the end edges of the blank, said flaps being substantially the same in width as said panels, said outer panels being formed adjacent to said flaps with tabs, the blank being formed with slots adapted to receive said tabs, one end edge of the blank being formed with longitudinal slots aligned with the fold lines, an outer transverse fold line adjacent to and spaced from said one end edge, said transverse fold line and said longitudinal slots defining side flaps and outer flaps, one of said outer flaps being formed with a lateral tab extending inwardly, the other outer flap being formed with a longitudinal slot adapted to receive said other outer flap, said side edges of the blank being formed with aligned transverse slots extending to the longitudinal fold lines and located between said tabs and said longitudinal slots, and an inner transverse fold line extending across the blank in line with said transverse slots.

7. A device of the character described, comprising a vertically elongated tube of rectangular cross section, said tube having a back wall, side walls extending forwardly from the back wall, front wall means extending between the side walls, a bottom wall on the back wall extending forwardly beyond the tube, an open top trough composed of said bottom wall and upstanding side walls extending along the inner sides of the tube side walls, said trough having an upstanding front wall extending between the trough side walls, tab means on the tube side walls, said trough side walls being formed with slit means through which the tab means extend, the device being formed from a single blank, said blank being of elongated rectangular form having side edges and end edges, a pair of longitudinal parallel fold lines extending the length of the blank, said fold lines being equally spaced from each other and from the side edges of the blank and defining middle and outer panels, said side edges having longitudinal side flaps thereon spaced from the end edges of the blank, said flaps being substantially the same in width as said panels, said outer panels being formed adjacent to said flaps with tabs, the blank being formed with slots adapted to receive said tabs, one end edge of the blank being formed with longitudinal slots aligned with the fold lines, an outer transverse fold line adjacent to and spaced from said one end edge, said transverse fold line and said longitudinal slots defining side flaps and outer flaps, one of said outer flaps being formed with a lateral tab extending inwardly, the other outer flap being formed with a longitudinal slot adapted to receive said other outer flap, said side edges of the blank being formed with aligned transverse slots extending to the longitudinal fold lines and located between said tabs and said longitudinal slots, and an inner transverse fold line extending across the blank in line with said transverse slots, and reduced width longitudinal tabs on the outer panels, said reduced width tabs being formed in the edges of the transverse slots remote from said one end edge of the blank.

References Cited by the Examiner

UNITED STATES PATENTS

| | | | |
|---|---|---|---|
| 204,562 | 6/1878 | Gunther | 119—18 |
| 357,493 | 2/1887 | McWilliams | 6—5 |
| 1,004,429 | 9/1911 | Hilton et al. | 206—31 |
| 1,008,265 | 11/1911 | Hilton | 206—31 |
| 1,378,533 | 5/1921 | FitzGerald | 229—17 |
| 1,524,244 | 1/1925 | Hodges | 119—50 |
| 1,791,956 | 2/1931 | Cowles | 119—23 |
| 2,684,792 | 7/1954 | Kraus | 222—457 |
| 2,943,600 | 7/1960 | Rosoff | 119—18 |

SAMUEL KOREN, *Primary Examiner.*

ALDRICH F. MEDBERY, *Examiner.*